Sept. 8, 1959
D. O. SPANN
2,903,088
PROCESS VESSELS
Filed Feb. 18, 1957
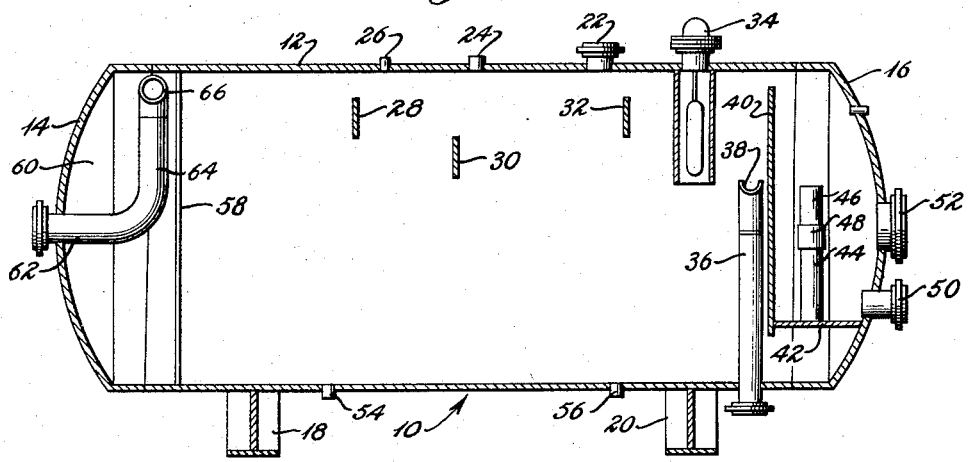
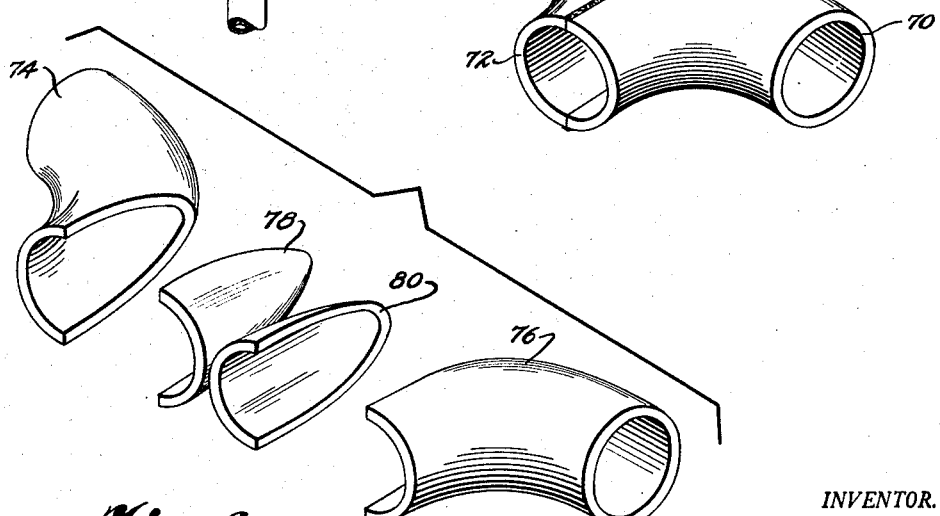
INVENTOR.
DELROY O. SPANN
BY
Diggins & LeBlanc
ATTORNEYS United States Patent Office 2,903,088
Patented Sept. 8, 1959

2,903,088

PROCESS VESSELS

Delroy O. Spann, Baton Rouge, La., assignor to Delta Tank Manufacturing Co., Inc., Baton Rouge, La., a corporation of Louisiana Application February 18, 1957, Serial No. 640,755

6 Claims. (Cl. 183—2.7)

This invention relates to process vessels and more particularly relates to horizontal process vessels having an improved stream inlet.

Conventional cylindrical process vessels which are mounted in a horizontal position, such as for instance, horizontal three phase separators used in oil field operations, are normally provided with stream inlets of either of two different types. In the first type the inflowing stream is directed into a series of baffles, while in the second type the inlet projects the incoming stream directly against an internal wall of the vessel. The baffle, or the internal vessel wall, as the case may be, dissipates the velocity of the liquid slugs entering the vessel so as to cause the liquid to drop into the lower portion thereof, while the gas escapes and flows toward the gas outlet. In most instances horizontal separators are provided with inlets which introduce the stream into the vessel in an axial direction.

In vertical process vessels it has been common practice to utilize inlets which are commonly referred to as tangential, which direct the incoming stream against the internal wall of the vessel at a small angle. Reference to this type of inlet as being tangential is somewhat misleading in that the stream is actually pumped against the internal tank wall in a manner which produces a less than streamlined flow. Such an arrangement is not readily adapted to horizontal tanks, and even in vertical tanks has resulted in the development of a swirl in the pool of liquid in the bottom of the tank with a deleterious effect upon overall separating efficiency.

According to the present invention it has now been found that materially improved operation of horizontal process vessels may be achieved through the use of an inlet which permits retention of the velocity of the incoming stream and which produces a streamlined split tangential flow from the top of the horizontal vessel down opposite side walls. A flow of this nature produces a large liquid-gas interface and, because of the particular arrangement of the inlet and the streamlined flow, tends to produce a centrifugal separation as the stream is delivered into the vessel. The streams flowing down opposite tank walls meet in the pool at the bottom of the tank moving in opposite directions and, instead of creating a swirl, tend to maintain the pool of liquid in a substantially quiescent condition.

In order to provide this split type of tangential flow it is necessary to utilize a stream splitter or flow diverter in association with the inlet. According to a feature of the invention this stream splitter or flow diverter is provided in such a form that the stream of fluid is forced by centrifugal force on to the vessel wall, rather than being pumped thereon in the conventional manner. While such a stream splitter may be constructed in a number of different ways, it has been found that a particularly advantageous and satisfactory method of producing such a stream splitter is through the use of a pair of approximately 90 degree elbows which are cut and welded together along a chordal plane which is generally parallel to axes of the elbows.

It is accordingly a primary object of the present invention to provide a horizontal process vessel having an improved inlet arrangement.

It is another object of the invention to provide a horizontal process vessel having an inlet which terminates in a flow diverter at the top of the vessel to direct oppositely disposed tangential streams down the circumferential walls of the vessel.

It is another object of the invention to provide a horizontal process vessel having an inlet which terminates in a flow diverter at the top of the vessel which smoothly flows oppositely disposed tangential streams onto the circumferential sidewalls of the vessel in such a manner that the streams are forced against the sidewalls by centrifugal force at the time they first engage such sidewalls.

It is another object of the invention to provide a horizontal process vessel having an inlet which terminates in a flow diverter which deposits oppositely disposed tangential streams smoothly on the sidewalls of the vessel in a manner such that the streams are subjected to centrifugal separation tendencies substantially at the time of deposit on the sidewalls of the vessel.

It is another object of the invention to provide a horizontal process vessel having an inlet which terminates in a flow diverter comprising a pair of sectioned elbows secured together and having ends directed in opposite directions.

It is another object of the invention to provide an improved vessel inlet comprising a pair of sectioned elbows secured together and having ends directed in opposite directions.

It is a still further object of the invention to provide an improved horizontal separator having an inlet connected to a vertically rising conduit terminating in a flow diverter which produces apposed tangential streams flowing from the top of the vessel downwardly along the inner walls in a circumferential manner.

These and further objects and advantages of the invention will become more apparent upon reference to the following specification and claims and appended drawings wherein:

Figure 1 is a vertical section of a horizontal three phase separator having an inlet constructed according to an embodiment of this invention;

Figure 2 is a perspective view showing the flow diverter used in the separator of Figure 1;

Figure 3 is an exploded perspective view showing the method of manufacturing the flow diverter of Figure 2; and Figure 4 is a partial vertical section showing the flow diverter mounted in the process vessel.

Referring more particularly to the figures of the drawing, there is shown at 10 a horizontal separator comprised of a horizontal cylinder 12 having a pair of end caps 14 and 16 welded thereto. The cylinder 12 is mounted on a pair of supports 18 and 20 and is provided with a gas outlet 22, relief valve connection 24 and pressure gauge connection 26. Quieting plates 28, 30 and 32 extend across the tank in a conventional manner and a liquid level controller 34 may be provided.

An oil outlet pipe 36 extends through the bottom of the tank and has an open upper end 38. A plate 40 extends across the cylinder adjacent the outlet pipe 36 and is connected to a horizontal plate 42 which is sealed to the end cap 16 and inner walls of the cylinder 12. A stand pipe 44 is mounted on horizontal plate 42 and communicates with an aperture therein. An adjustable siphon pipe 46 is mounted on top of stand pipe 44 and connected thereto by adjustable coupling 48. A water outlet 50 is mounted on end cap 16 just above horizontal plate 42. A hand hole 52 may be provided in the center of the end cap to provide access to the interior of the vessel.

As is well known by those skilled in the art, the level of the entire body of liquid in the tank is controlled by the liquid level controller 34, while the level of the water and oil interface is controlled by the height of the siphon pipe 46. By substituting different length pipes 46 the level of the interface can be adjusted. A pair of drains 54 and 56 may be provided in the tank bottom.

Referring to the left end of the vessel shown in Figure 1, a perforated distributor plate 58 is mounted across the cylinder 12 to form an inlet space 60 within the end cap 14. An inlet pipe 62 enters the center of the end cap 14 axially and has a vertically extending portion 64 which terminates in a stream splitter or flow diverter 66 at the top of the vessel.

Referring to Figures 2 and 4, the flow diverter 66 has oppositely disposed nozzles or outlets 68 and 70 adapted to discharge the incoming stream tangentially against the inner surface of the cylindrical portion of the vessel at the top thereof. The stream splitter 66 has a common opening 72 which may be welded to the vertical portion 64 of inlet pipe 62.

While the stream diverter 66 may be manufactured in a number of different ways, as will be apparent to those skilled in the art, one arrangement which has been found highly economical and satisfactory is that shown in Figures 2 and 3. According to this method of construction the flow diverter of Figure 2 may be formed from a pair of 90 degree elbows or pipe sections 74 and 76 which have chordal sections 78 and 80 cut therefrom along vertical planes parallel to the associated axis of each elbow as seen in Figure 3. That is to say, each elbow 74 and 76 is cut along a plane 82, shown in Figure 4, which lies along the axis of one end of each elbow, perpendicular to the axis of the other end of the elbow. This imaginary plane should bisect the cut end of each elbow but the axis of the elbow does not necessarily have to lie in this plane. That is to say, the axes of the elbows may lie in this plane, as shown in the drawings, but may also be at greater or lesser angles to provide output angles for the outlets 68 and 70 to deliver the fluid to the specific tank at tangential angles.

Referring to Figure 4, and assuming that an inlet stream is being supplied to inlet pipe 64 at such a velocity as to substantially fill that pipe, it will be seen that after the stream is split at the juncture of elbows 74 and 76, the split stream portions 84 and 86 are forced by centrifugal force against the upper portions of the elbows. This creates a centrifugal separation tendency which is continued as the opposed streams leave the flow diverter and tangentially flow along the inner wall 88 of the separator vessel. From here the oppositely disposed streams flow down the walls of the vessel to enter the pool of liquid which has collected therein. Because of the oppositely disposed nature of the streams, no swirl or turbulence is set up in this pool. In order to obtain the desired centrifugal action the effective radius of curvature of the elbows should be relatively small and generally less than approximately one-third the radius of the vessel wall against which the inlet discharges. Also the elbows preferably discharge within a sector no more than approximately one-fifth of the periphery of the wall against which they discharge.

While the entrance of the inlet stream pipe 62 into the end cap 14 radially has been found advantageous this is not essential and this pipe may enter the bottom or top wall of the unit. Further while the inlet arrangement of this invention has been described in connection with a three phase separator suitable for use in oil field operations, it will be apparent to those skilled in the art that the inlet has advantageous uses with other types of horizontal process vessels and the invention is not limited to separators. On the other hand, the use of the inlet in a separator vessel of this type provides a highly efficient separating action and forms a preferred embodiment of the invention. While the inlet is described in connection with horizontal generally cylindrical vessels it will be apparent that it may also be used in spherical vessels.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by the United States Letters Patent is:

1. In a process vessel having a generally cylindrical portion mounted with its axis substantially horizontal, an inlet pipe entering said vessel, and a stream splitter connected to said inlet pipe and having a first portion extending substantially radially toward the internal wall of said cylindrical portion, said stream splitter having a pair of conduits extending from said first portion in smooth curves to terminate in oppositely disposed nozzles adjacent the inner wall of said cylindrical portion of said vessel for discharging oppositely directed streams generally tangentially onto said internal wall near the uppermost portion of said wall, said streams being urged by centrifugal force into the side walls of said nozzles which are closest to said internal wall.

2. In a process vessel having a generally cylindrical portion mounted with its axis substantially horizontal, an inlet pipe entering said vessel, and a stream splitter connected to said inlet pipe and having a first portion extending substantially radially toward the internal wall of said cylindrical portion, said stream splitter having a pair of conduits extending from said first portion in smooth curves to terminate in oppositely disposed nozzles adjacent the inner wall of said cylindrical portion of said vessel and terminating within a segment comprising no more than one-fifth the periphery of said vessel, for discharging oppositely directed streams generally tangentially onto said internal wall near the uppermost portion of said wall.

3. A device as set out in claim 1 wherein said stream splitter comprises a pair of sectioned elbows joined together along the section cuts.

4. A device as set out in claim 1 wherein said stream splitter comprises a pair of pipe sections having curvate axes and joined together so that said axes are coincident at the point of joinder of said stream splitter to said inlet pipe.

5. A device as set out in claim 1 wherein the effective radius of said smooth curves is less than one-third the radius of the cylindircal poriton of said vessel.

6. A device as set out in claim 5 wherein the centers of curvature of said smooth curves lie within said vessel between the axis thereof and said nozzles.

References Cited in the file of this patent

UNITED STATES PATENTS

| 265,242 | Chafer | Oct. 3, 1882 |
| 1,255,562 | Olson | Feb. 5, 1918 |
| 1,291,602 | Murray | Jan. 14, 1919 |
| 2,562,967 | Teglund | Aug. 7, 1951 |
| 2,642,949 | Tyskewicz | June 23, 1953 |
| 2,664,963 | Lovelady et al. | Jan. 5, 1954 |